US011496803B2

(12) United States Patent
Salisbury et al.

(10) Patent No.: US 11,496,803 B2
(45) Date of Patent: Nov. 8, 2022

(54) VIDEO STREAM SWITCHING SERVICE

(71) Applicant: HULU, LLC, Santa Monica, CA (US)

(72) Inventors: McKay Salisbury, Culver City, CA (US); Jeremy Cutler, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 141 days.

(21) Appl. No.: 16/271,574

(22) Filed: Feb. 8, 2019

(65) Prior Publication Data
US 2020/0260144 A1 Aug. 13, 2020

(51) Int. Cl.
*H04N 7/173* (2011.01)
*H04N 21/458* (2011.01)
*H04N 21/435* (2011.01)
*H04N 21/437* (2011.01)

(52) U.S. Cl.
CPC ....... *H04N 21/4583* (2013.01); *H04N 21/435* (2013.01); *H04N 21/437* (2013.01)

(58) Field of Classification Search
CPC ............ H04N 21/812; H04N 21/4331; H04N 21/4532; H04N 21/235; H04N 21/435; H04N 21/437; H04N 21/458; H04N 21/4583; H04N 21/814; H04N 21/8146; H04N 21/44222; H04N 21/2581; H04N 21/25883; H04N 21/23439; H04N 21/2404; H04N 21/2662; H04N 21/2393
See application file for complete search history.

(56) References Cited

U.S. PATENT DOCUMENTS

| 5,914,746 A * | 6/1999 | Matthews, III ........... H04N 5/50 725/132 |
| 2002/0054087 A1* | 5/2002 | Noll ................... H04N 21/4782 715/744 |
| 2002/0057297 A1* | 5/2002 | Grimes ............... G06F 16/9577 715/810 |
| 2005/0132295 A1* | 6/2005 | Noll ................. H04N 21/44222 715/744 |
| 2006/0098573 A1* | 5/2006 | Beer ....................... H04L 45/22 370/230 |
| 2006/0168624 A1* | 7/2006 | Carney ............ H04N 21/26283 348/E7.071 |
| 2007/0157252 A1* | 7/2007 | Perez ................. H04N 21/4821 348/E7.071 |
| 2007/0240190 A1* | 10/2007 | Arseneau ............... H04N 5/445 725/81 |
| 2008/0244678 A1* | 10/2008 | Kim ..................... H04N 21/235 725/118 |

(Continued)

*Primary Examiner* — Annan Q Shang
(74) *Attorney, Agent, or Firm* — Kwan & Olynick LLP

(57) ABSTRACT

In one embodiment, a method receives a first stream identifier for a video stream. The first stream identifier is received in a request from a client for the video stream. The method selects a virtual stream identifier for the first stream identifier where the virtual stream identifier is associated with a plurality of physical stream identifiers associated with a plurality of physical streams. A ranking of the plurality of physical stream identifiers is analyzed to select one of the physical stream identifiers. Then, the method outputs the one of the physical stream identifiers as the video stream to use in response to the request for the first stream identifier. The one of the physical stream identifiers is sent to the client to allow the client to request the respective physical stream.

22 Claims, 9 Drawing Sheets

(56) References Cited

U.S. PATENT DOCUMENTS

| | | | |
|---|---|---|---|
| 2008/0320158 A1* | 12/2008 | Simonds | H04N 21/454 709/231 |
| 2009/0031358 A1* | 1/2009 | Ling | H04N 21/4583 725/58 |
| 2009/0106803 A1* | 4/2009 | Chen | H04N 21/2387 725/103 |
| 2010/0023635 A1* | 1/2010 | Labonte | H04L 47/283 709/231 |
| 2010/0251282 A1* | 9/2010 | Howcroft | H04N 7/16 725/25 |
| 2012/0117488 A1* | 5/2012 | Amidon | H04N 21/454 715/753 |
| 2012/0278725 A1* | 11/2012 | Gordon | H04N 21/25891 715/738 |
| 2013/0057639 A1* | 3/2013 | Ralston | H04L 65/764 348/14.02 |
| 2013/0086607 A1* | 4/2013 | Tom | H04N 21/25891 725/32 |
| 2014/0109128 A1* | 4/2014 | Lee | H04N 21/4622 725/25 |
| 2015/0106472 A1* | 4/2015 | Viveganandhan | H04N 21/8456 709/217 |
| 2016/0127440 A1* | 5/2016 | Gordon | H04N 21/23439 709/219 |
| 2016/0381110 A1* | 12/2016 | Barnett | H04L 65/601 709/231 |
| 2017/0126256 A1* | 5/2017 | Salomons | H03M 13/6547 |
| 2017/0353516 A1* | 12/2017 | Gordon | H04L 67/10 |
| 2018/0160159 A1* | 6/2018 | Asarikuniyil | H04L 65/613 |
| 2019/0069039 A1* | 2/2019 | Phillips | H04N 21/6587 |
| 2019/0182554 A1* | 6/2019 | Schupak | H04N 21/2187 |
| 2020/0162796 A1* | 5/2020 | Azuolas | H04N 21/23439 |
| 2020/0195994 A1* | 6/2020 | Eluvan | H04N 21/2662 |

* cited by examiner

| Virtual Stream ID | Physical Stream ID | Rank |
|---|---|---|
| VS #1 | PS #1 | 1 |
| VS #1 | PS #3 | 2 |
| VS #1 | PS #2 | 3 |
| VS #2 | PS #4 | 1 |
| VS #2 | PS #5 | 2 |

FIG. 6A

| Physical Stream ID | State | Time |
|---|---|---|
| PS #1 | STREAM DOWN | 2:00 p.m. |
| PS #4 | STREAM DOWN | 4:00 p.m. |

FIG. 6B

VIDEO STREAM SWITCHING SERVICE

BACKGROUND

A video delivery system may offer a live video service that includes video assets that allow a user to select one of the video assets to view. For a given video asset, the video delivery system may receive duplicate physical streams from multiple sources. For example, the video delivery system may receive a first physical video stream from a first stream provider and a second physical stream from a second stream provider. The physical streams may have the same content, but have other varying characteristics, such as the stream may vary in quality.

The video delivery system selects one of the physical streams (e.g., the first physical stream or the second physical stream) for a video asset as the default video stream. The video delivery system may store a physical stream identifier as the default video stream, such as the physical stream identifier for the first physical stream. Various services of the video delivery system then use the default video stream. For example, clients may request the video asset using the default video stream identifier, which may be the first physical stream identifier for the first physical stream. However, in some cases, issues may occur with the first physical stream, such as the first physical stream may have an outage. When the outage occurs, the video delivery system may be manually altered to change the default stream for the video asset from the first physical stream to the second physical stream. Making the manual change may take a large amount of time to respond to the issue.

BRIEF DESCRIPTION OF THE DRAWINGS

FIG. 6A depicts an example of a table that a virtual stream service uses to determine the optimal physical stream identifier according to some embodiments.

FIG. 6B depicts an example of changing table when an issue occurs with a physical stream according to some embodiments.

DETAILED DESCRIPTION

Figure 1:
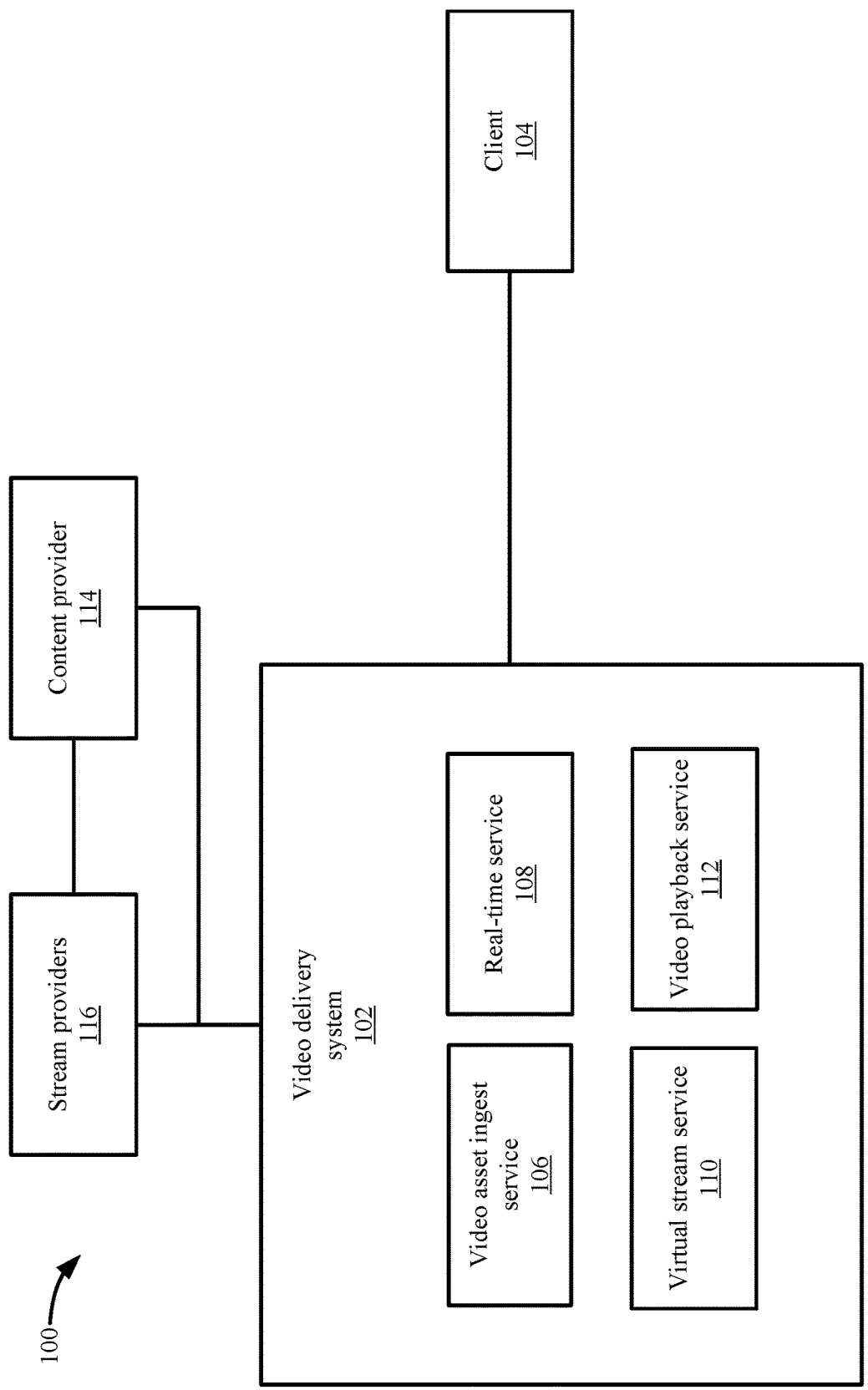
FIG. 1 depicts a simplified system of a method for using a virtual stream identifier according to some embodiments.

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

A video delivery system may offer a live video service that includes video assets that are each associated with a stream of video content. However, a video asset being offered by the video delivery service may be associated with multiple physical streams. Any of these physical streams may be sent to a client, but the physical streams may vary, such as the physical streams may vary in quality. The video delivery system uses a virtual stream identifier to determine a physical stream to provide to the client. For example, a virtual stream service may map the virtual stream identifier to corresponding physical streams that are available for the video asset. The physical streams may be ranked based on different characteristics of the physical streams, such as the physical streams may be ranked from the highest quality to the lowest quality, on whether any physical streams experienced any downtime during a time period, and based on other characteristics.

When a client sends a request for a video asset, the request may include a video asset identifier. The virtual stream service determines the virtual stream identifier that is associated with the video asset identifier, and then may determine the physical stream that is currently the optimal physical stream for the virtual stream identifier. The video asset identifier may be used to determine the virtual stream identifier or a physical stream identifier associated with one of the physical streams. In either case, the virtual stream service determines the virtual stream identifier, such as by mapping the physical stream identifier to the virtual stream identifier when the physical stream identifier is used as the video asset identifier. The virtual stream service then returns the optimal physical stream identifier, which is forwarded to the client. The client can then request the physical stream using the physical stream identifier.

When issues occur with one of the physical streams, such as an issue occurs with the optimal physical stream, the virtual stream service may return a different physical stream as the optimal physical stream. Thus, when a client sends a request using the video asset identifier, the virtual stream service can determine the virtual stream identifier and the associated optimal physical stream. If a previous optimal physical stream has changed to a different physical stream, the virtual stream service returns a different physical stream identifier, which is then forwarded to the client. The client can then request a second physical stream.

Using the virtual stream service allows the video delivery system to respond automatically and dynamically to issues that occur to a physical stream. The virtual stream service may be integrated into a client request process and thus responds to issues with a physical stream faster than a service that is not integrated into the request process. Further, using the virtual stream identifier allows the video delivery system to change physical streams being delivered to a client for the same video asset.

System Overview

FIG. 1 depicts a simplified system 100 of a method for using a virtual stream identifier according to some embodiments. A video delivery system 102 may provide videos that are requested by clients 104 that are being used by users. Video delivery system 102 may offer a live video service that provides video streams on a linear schedule. For example, users can request video assets on a set schedule where a video asset is a television show, movie, live sporting event, or other types of video. The live video service may offer the video asset only during the time it is scheduled in the linear schedule. However, the live video service may also offer the live version of the video asset at a later time, such as a user can view the video asset within twenty four hours of its broadcast on the linear schedule. Video delivery system 102 may also provide an on-demand service that allows client 104 to request video assets at any time on-demand without regard to any linear schedule. The video asset may be a channel that is showing video assets in the linear schedule, a single video (e.g., a program), a list of programs, recently watched programs, promoted programs, etc.

Video delivery system 102 may include a set of computing devices, such as servers, that can coordinate delivery of a video asset to client 104, which may include a media player to play the video. Client 104 may include different devices that can play video assets, such as smart phones, gaming consoles, personal computers, laptops, tablet devices, and set top boxes, etc. In some embodiments, video delivery system 102 may send the videos to client 104. In other examples, video delivery system 102 may communicate with content delivery networks (CDNs) to cause the CDNs to send the videos to client 104.

A content provider 114 may be the initial provider of a video stream. A video stream may include multiple video assets that are organized on the linear schedule. Each video asset may be associated with a video stream. Content provider 114 provides the video stream to different stream providers 116. Each stream provider 116 may provide a different physical stream that can be delivered to client 104 where each different physical stream may have different characteristics, which may be related to the delivery of the video stream. For example, physical streams have the same content, but can vary in different ways. For example, the physical streams may not be in exact synchronization in time, with one physical stream anywhere from a second to 30 seconds behind the other physical stream at a current time. Second, it is possible that two physical streams may have different sets of resolutions. This may prevent the replacing of segments in one physical stream being sent with segments from another physical stream. Even though resolutions might be similar, the resolutions are not always identical and restarting playback is required for the clients to handle the change. On that same note, some physical streams may have high definition resolution options (or more high definition options) than another physical stream.

Video delivery system 102 includes a video asset ingest service 106, a real-time service 108, a virtual stream service 110, and a video playback service 112. Video asset ingest service 106 may receive a schedule from content provider 114. The schedule may list the video assets in the video stream that are available in the linear schedule. Video asset ingest service 106 may then generate metadata, such as bundles, that summarize the schedule and the video assets. In the bundles, video asset ingest service 106 inserts a default stream, which is the default stream that is requested from client 104.

Video playback service 112 may communicate with client 104 to enable the video playback of a video stream. Video playback service 112 receives requests from clients 104 for video assets. For example, video playback service 112 may use the bundles to generate a schedule of available video assets and send the schedule to client 104. Each of the video assets may be associated with a video asset identifier. The video asset identifier may be associated with a bundle that identifies the default video stream. Client 104 can then request one of the video assets using an associated video asset identifier. In some examples, the video asset identifier may identify a program being offered at a specific time or time range. The selection of the video asset may be performed by selecting a specific video asset or a channel that is offering a video asset.

Video playback service 112 determines a default stream identifier for the video asset. The default stream identifier may be used to identify a physical stream that is offering the video asset. In some examples, the default stream identifier may be a virtual stream identifier or physical stream identifier for the video asset.

Virtual stream service 110 is integrated into the request process that occurs between client 104 and video playback service 112. Virtual stream service 110 uses virtual stream identifiers to determine which physical stream should be used by client 104. For example, video playback service 112 contacts virtual stream service 110 with the default stream identifier. Then, virtual stream service 110 may map the default stream identifier to a virtual stream identifier and select one of the physical stream identifiers that correspond to the virtual stream identifier. Virtual stream service 110 may select the physical stream identifier using different methods. For example, the physical stream identifiers may be ranked based on a priority, such as by a quality characteristic, and virtual stream service 110 may select the optimal physical stream identifier. Also, virtual stream service 110 may consider stream state, such as if issues occurred with respect to the physical streams, such as outages that occurred. Virtual stream service 110 may use some combination of the ranking and the state, or just the ranking or state.

Real-time service 108 may process issues that may occur with physical streams. For example, when an issue with a physical stream occurs, such as there being an outage with a physical stream, real-time service 108 may notify virtual stream service 110 of the issue. The issue may affect the physical stream that is selected by virtual stream service 110 as the optimal physical stream. For example, a physical stream that is currently the optimal for a virtual stream identifier may not be the optimal physical stream when an issue occurs.

Because virtual stream service 110 is integrated into the playback process that occurs between client 104 and video playback service 112, this allows virtual stream service 110 to respond to issues that occur with a physical stream in real-time. When requests from client 104 are received for a video asset, the requests may include the same video asset identifier. Video playback service 112 maps the video asset identifier to a default stream identifier and contacts virtual stream service 110 to perform the above process to determine the optimal physical stream for the virtual stream identifier associated with the default stream identifier. Due to the issue with a previously optimal physical stream, virtual stream service 110 may return a different physical stream identifier for a different physical stream in response to the request. In some examples, when an issue is encountered, clients 104 are notified to re-request the video asset using the video asset identifier again to trigger to switchover to the new physical stream. In this way, video delivery system 102 addresses the issue with the physical stream using virtual stream service 110.

Figure 2:
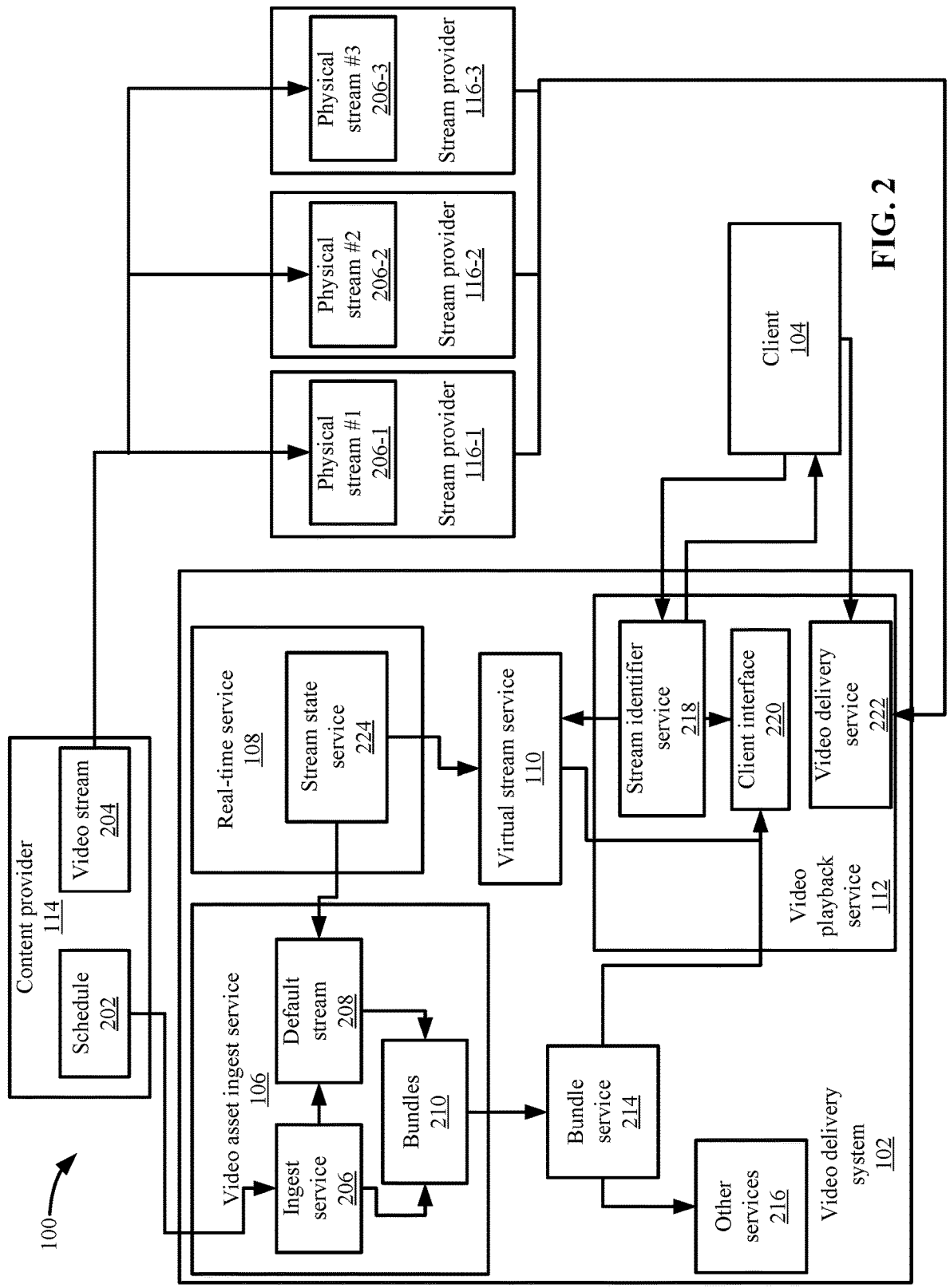
FIG. 2 depicts a more detailed example of the system according to some embodiments.

The above process will now be described in more detail. FIG. 2 depicts a more detailed example of system 100 according to some embodiments. Content provider 114 may provide a video stream 204 that may be offered live on a linear schedule 202. Although one video stream is discussed with one content provider, it will be understood that multiple video streams and content providers may be provided. The video stream may include one video or multiple videos.

Content provider 114 may send video stream 204 to different stream providers 116-1 to 116-3. Each stream provider 116 may provide the video stream in a separate physical stream 206. For example, a first stream provider 116-1 may provide a first physical stream #1 206-1, a second stream provider 116-2 may provide a second physical stream #2 206-2, and a third stream provider 116-3 may provide a third physical stream #3 206-3.

Schedule 202 may summarize the video assets and times in which each video asset on video stream 204 is available. For example, schedule 202 may indicate that a first video asset is available from 6:00 p.m. to 7:00 p.m. on a certain date, a second video asset is available from 7:00 p.m. to 8:00 p.m. on the date, etc.

Ingest service 106 receives schedule 202 from content provider 114 (in addition to other schedules from other content providers) and processes schedule 202. Ingest service 106 may create bundles 210 that include metadata describing the video stream. For example, a bundle 210 may describe the video stream, access rules, and other information. In some embodiments, if the video stream includes multiple video assets, each video asset may have an associated bundle 210. Additionally, if multiple physical streams 206 are available, ingest service 106 determines a default stream 208 that is inserted into each bundle 210. The default stream may be the stream that corresponds to the video asset identifier. For instance, one bundle 210 may be valid for client 104 during a time for a video asset. That bundle 210 will include a default stream identifier for default stream 208.

A bundle service 214 receives bundles 210 and can provide information for bundles 210 to video playback service 112. For example, video playback service 112 uses bundles 210 to provide a schedule for the video assets being offered on a live video service. Bundle service 214 may also provide bundles 210 to other services 216 that may use the information in bundles 210. Other services 216 may be services that are not associated with providing the live video service to client 104.

Figure 3:
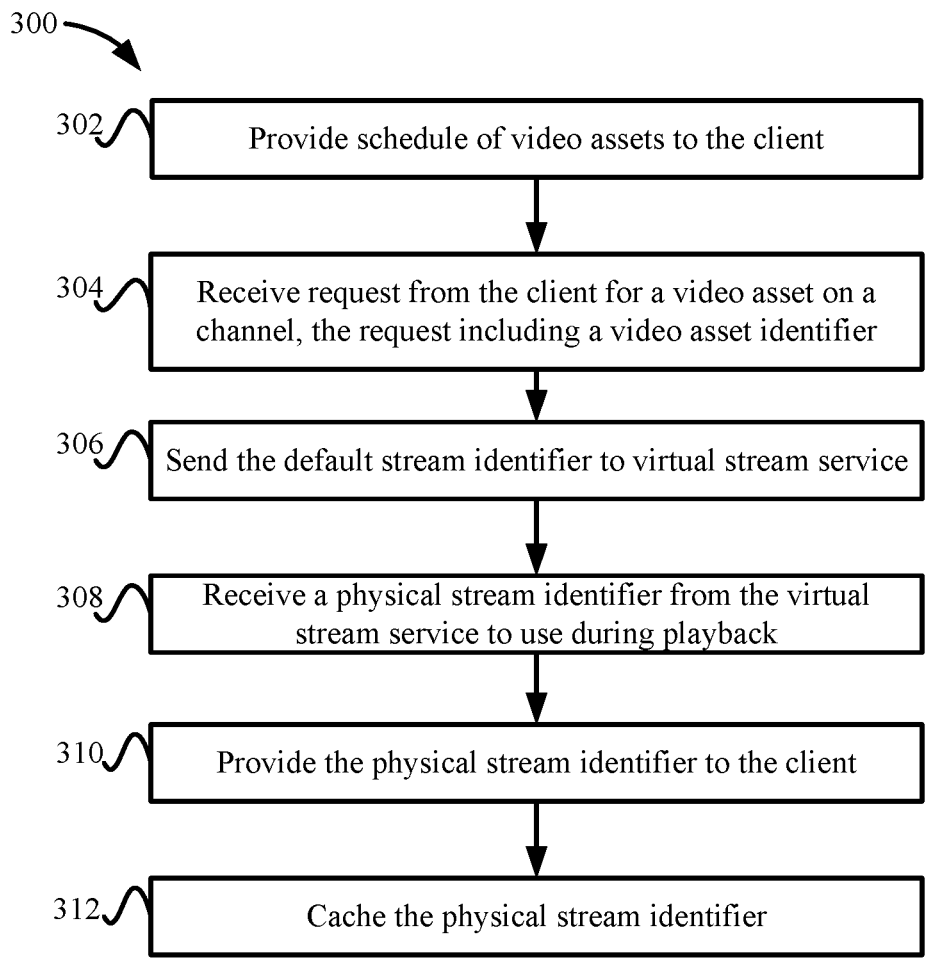
FIG. 3 depicts a simplified flowchart of a method for processing requests from a client according to some embodiments.

Client interface 220 then processes requests from clients 104. FIG. 3 depicts a simplified flowchart 300 of a method for processing requests from client 104 according to some embodiments. At 302, client interface 220 provides a schedule of video assets to client 104. Client interface 220 can receive bundles 210 and can generate the schedule for client 104. For instance, based on a client's access rights (e.g., a user account's access rights), client interface 220 generates the schedule of video streams that are available to that client 104. In some examples, client interface 220 may analyze bundles 210 to determine which video assets are available in the live video service for a user of client 104. Client interface 220 can then provide the schedule to client 104, which may display the schedule for the live video service.

A user can browse the schedule and eventually select one of the video assets for playback. At 304, stream identifier service 218 receives a request from client 104 for a video asset that includes a video asset identifier. Also, the request may include a time for the request, such as a time range (e.g., 2:00 p.m., 2:00 p.m. to 4:00 p.m., etc.).

The selection for playback is sent to a stream identifier service 218. In some embodiments, client 104 sends the video asset identifier for the selected video asset to stream identifier service 218. The video asset identifier identifies the video asset in a bundle 210. Stream identifier service 218 identifies a default stream identifier for the video asset identifier. In some embodiments, the default stream identifier may be a virtual stream identifier. However, in other examples, the default stream identifier may be a physical stream identifier and may reference one of physical streams #1, #2, or #3. As will be discussed in more detail below, stream identifier service 218 may communicate with client interface 220 to determine the default stream identifier. However, in other embodiments, stream identifier service 218 may determine the default stream identifier. Alternatively, the video asset identifier may be the default stream identifier. At 306, stream identifier service 218 sends a default stream identifier to virtual stream service 110.

Figure 4:
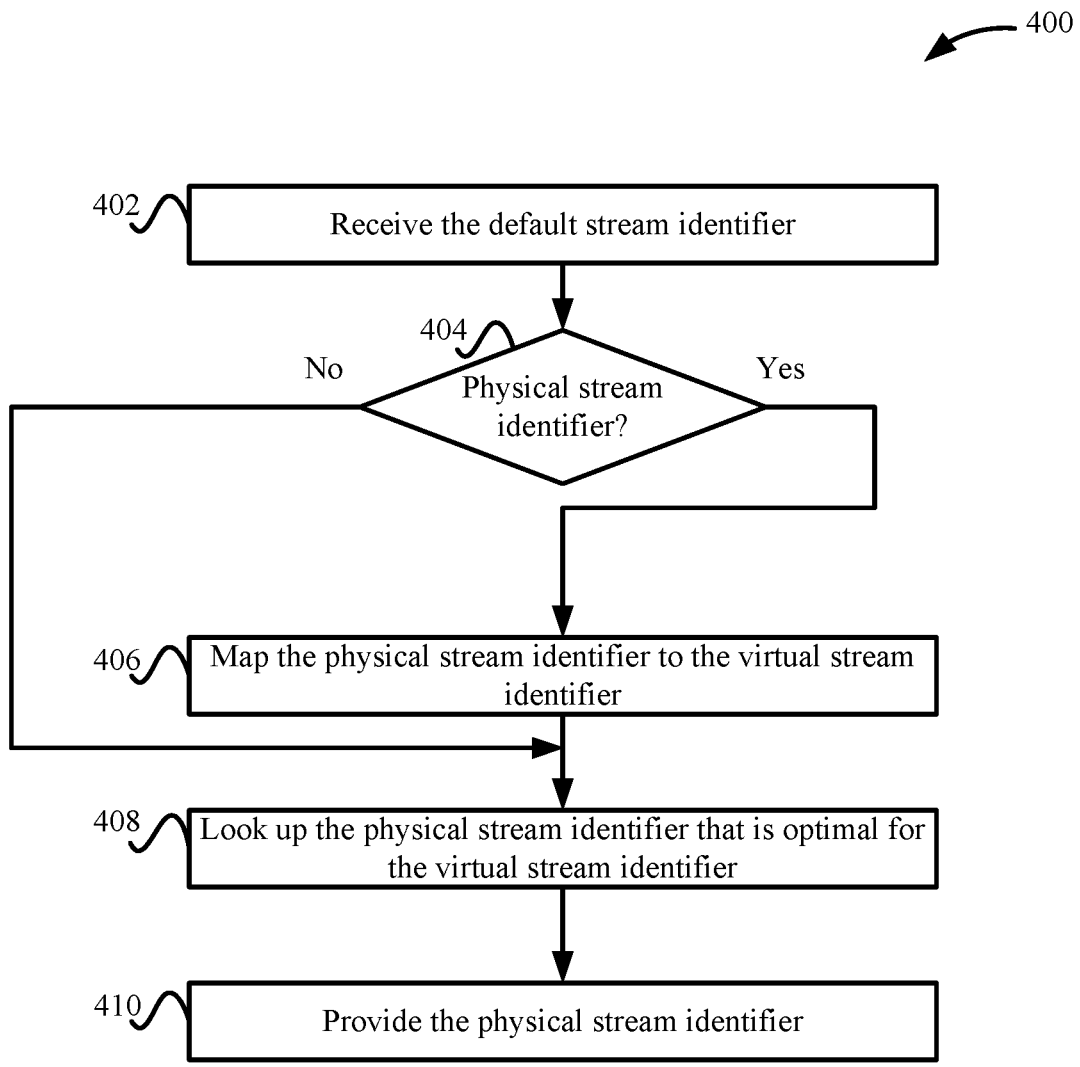
FIG. 4 depicts a simplified flowchart of a method for processing a video asset identifier according to some embodiments.

Instead of providing a fixed default physical stream, stream identifier service 218 communicates with virtual stream service 110. Virtual stream service 110 can then determine which is the optimal physical stream to provide to client 104 for the default stream identifier. FIG. 4 depicts a simplified flowchart 400 of a method for processing a default stream identifier according to some embodiments. At 402, virtual stream service 110 receives the default stream identifier that was determined from the video asset identifier. For example, the default stream identifier may be the virtual stream identifier or the physical stream identifier.

At 404, virtual stream service 110 determines if the default stream identifier is a physical stream identifier. For example, default stream 208 may be a physical stream identifier or virtual stream identifier. If the default stream identifier is a physical stream identifier, at 406, virtual stream service 110 maps the default stream identifier to a virtual stream identifier. Virtual stream service 110 may use different techniques to determine the virtual stream identifier from the physical stream identifier. For example, the virtual stream identifier may be mapped to multiple physical stream identifiers. Also, each physical stream identifier may be mapped to the virtual stream identifier. In some embodiments, the virtual stream identifier may be mapped to multiple physical stream identifiers, but a physical stream identifier may be mapped to a single virtual stream identifier.

At 408, once the virtual stream identifier is known, virtual stream service 110 looks up the physical stream identifier that is optimal for the virtual stream identifier. Virtual stream service 110 may perform the selection of the optimal physical stream identifier differently. In some embodiments, virtual stream service 110 may use a ranking of physical streams and also may determine whether some physical streams have or had encountered issues. In some examples, virtual stream service 110 selects the physical stream identifier without using a time range or with using a time range.

When not using a time range, virtual stream service 110 retrieves all physical stream identifiers associated with the virtual stream identifier. The physical stream identifiers may be ranked based on a priority. Also, virtual stream service 110 may determine the current state of each physical stream. The current state may be based on whether any physical streams have or had encountered any issues. In some embodiments, physical stream identifiers may be associated with a state change record that indicates whether a stream has encountered an issue. For example, the state change record may indicate a stream encountered an outage or recovered from an outage. Virtual stream service 110 then selects the physical stream identifier that is highest ranked with a current state that indicates no issue is being experienced.

When using a time range, virtual stream service 110 retrieves all physical stream identifiers associated with the virtual stream identifier. The physical stream identifiers may be ranked based on a priority. Also, virtual stream service 110 may determine any issues that occurred during the time range based on the state of each physical stream. In some examples, virtual stream service 110 uses state change records that indication changes that occurred during the time range. In some examples, virtual stream service 110 calculates a time that each physical stream was not encountering issues (e.g., did not encounter an outage). To calculate an uptime when no issue was encountered, virtual stream service 110 may use state change identifiers of STREAM DOWN and STREAM UP, which mean a physical stream is experiencing an outage and is not experiencing an outage, respectively. Virtual stream service 110 may start with the entire time range, and then subtract the time between each STREAM DOWN and STREAM UP pair. In some examples, virtual stream service 110 may calculate the uptime by:

i. if the first state change in the time range is STREAM UP, then assume that the stream was down between the start time and that state change and subtract that time;
ii. if the first state change in the time range is STREAM DOWN, then assume that the stream was up from the start time until that state change (do not subtract that time);
iii. if the last state change in the time range is STREAM DOWN, then assume that the stream was down between the time of that state change and the end time, and subtract that time;
iv. if no state changes occurred in that time, find the state change that occurred most recently before start time. If that was a STREAM DOWN, subtract the entire start to end time from the total.

Upon performing the above calculations, virtual stream service 110 selects the physical stream identifier with the most uptime between start time and end time. In case of a tie, virtual stream service 110 selects the physical stream identifier that is ranked highest out of the ones associated with the virtual stream identifier. Also, virtual steam service 110 may determine the highest ranked physical stream identifier that did not experience any issues and select that one.

Although the above calculations are discussed, virtual stream service 110 may use other methods for selecting the physical stream identifier using a time range. In other examples, virtual stream service 110 may consider the time to determine which physical stream to select. For example, some physical streams may be ranked higher during certain times but lower during other times. In some examples, when an outage for physical stream #1 occurred from 6:00 p.m. to 8:00 p.m., the physical stream #1 is ranked lower during that time. Accordingly, if the request covers any part 6:00 p.m. to 8:00 p.m., virtual stream service 110 may use the rankings for that time period. Also, virtual stream service 110 may alter the rankings based on an issue, such as lowering a physical stream in the rankings when that physical stream encounters an issue.

At 410, virtual stream service 110 provides a physical stream identifier to client interface 220. By integrating virtual stream service 110 in the request process, virtual stream service 110 can dynamically determine the physical stream identifier when a request is received. This allows virtual stream service 110 to react to issues that may occur with physical streams as will be described in more detail below.

Referring back to FIG. 3, at 308, stream identifier service 218 receives a physical stream identifier from virtual stream service 110 to use during playback. The physical stream identifier may be the same as the default stream identifier. However, the physical stream identifier may also be different from the default stream identifier, such as when the default stream identifier was the virtual stream identifier or a physical stream identifier that was not the optimal physical stream for a corresponding virtual stream identifier. At 310, stream identifier service 218 provides the physical stream identifier to client 104. For example, stream identifier service 218 provides a manifest that includes the physical stream identifier. The manifest includes information that allows client 104 to request the physical stream, such as information for segments of the physical stream and the address for the physical stream.

At 312, client interface 220 may cache the physical stream identifier as the preferred stream identifier to provide for the client. When subsequent requests are received for the video asset identifier, client interface 220 may use the cache to provide stream identifier service 218 with the optimal physical stream identifier. This may allow stream identifier service 218 to bypass the time it takes to communicate with virtual stream service 110. However, to make sure the ranking of the physical streams do not change, which makes the cache inaccurate, virtual stream service 110 may notify client interface 220 of any changes to the ranking and client interface 220 can nullify the cache entry for that video asset identifier. In other examples, stream identifier service 218 may send the cached optimal physical stream identifier to virtual stream service 110, which can check if the cached optimal physical stream identifier is still the optimal one.

Client 104 may then use the physical stream identifier in the manifest to request the video asset from a video delivery service 222. In some embodiments, client 104 can receive a link, such as a uniform resource locator, that client 104 can use to retrieve the physical stream. Video delivery service 222 may have received physical streams #1, #2, and #3 and stored them with reference to their physical stream identifiers. Video delivery service 222 may cause the delivery of the physical stream to client 104, such as by sending the physical stream to client 104 or by sending the physical stream via a content delivery network.

Real-Time Issue Processing

Stream state service 224 may receive a notification of an issue with a physical stream. For example, some problem with physical stream #1 may occur, such as an outage. Once the issue is detected, stream state service 224 receives an indication and can automatically notify virtual stream service 110. For example, stream state service 224 may indicate that physical stream #1 has an outage starting at a certain time (and possibly ending at a certain time when the outage is fixed). Stream state service 224 may detect the issue automatically, such as by a server or client sending a message when an outage occurs. Also, stream state service 224 may receive a user input indicating an outage is occurring or has occurred. Virtual stream service 110 then uses the information from stream state service 224 to update information for the physical streams associated with the virtual stream identifier. In some examples, virtual stream service 110 may update a state of a physical stream based on an issue, such as an outage. In one example, virtual stream service 110 updates the state as STREAM DOWN state when a physical stream experiences an outage and updates the state as STREAM UP when a physical stream recovers from an outage.

When issues occur, virtual stream service 110 can then provide a different physical stream identifier a default stream identifier when contacted by stream identifier service 218.

Because virtual stream service 110 is integrated in the request process, when an issue occurs with a physical stream, the optimal physical stream for a virtual stream identifier may be changed and then a new physical stream is provided upon the next request for the default stream identifier. This may be quicker than having stream state service 224 update the default stream 208 using video asset ingest service 106 because ingest service 206 is not integrated into the request process. When ingest service 206 performs an update, bundles 210 need to be updated and propagated through bundle service 214. This may be a manual process that may take a long time to propagate through video delivery system 102. However, since video stream service 110 is integrated in the request process, once video stream service 110 is notified of the issue, any further request for the virtual stream identifier may take the issue into account.

Figure 5:
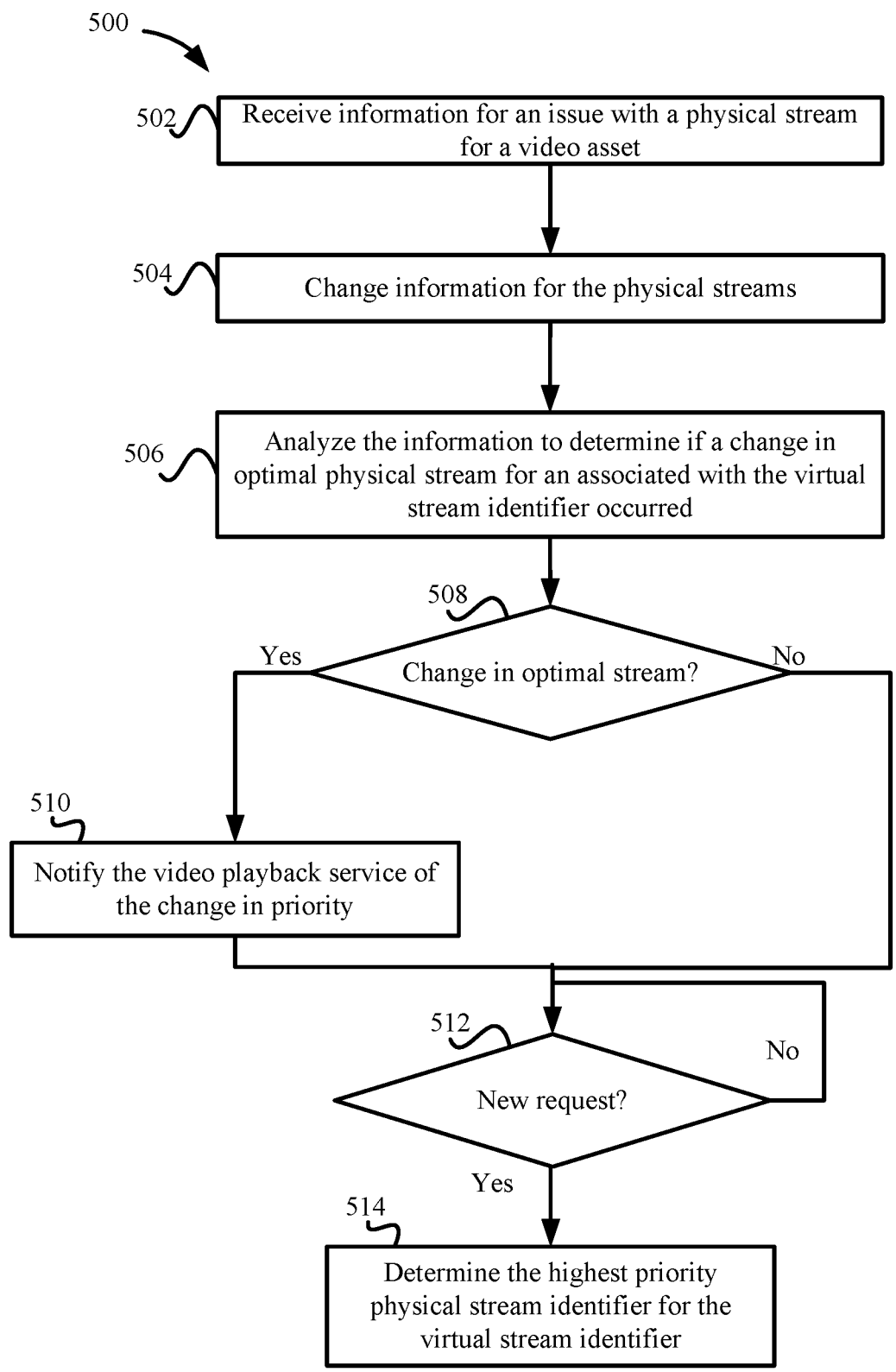
FIG. 5 depicts a simplified flowchart of a method for real-time issue processing for a physical stream according to some embodiments.

FIG. 5 depicts a simplified flowchart 500 of a method for real-time issue processing for a physical stream according to some embodiments. At 502, virtual stream service 110 receives information for an issue with a physical stream for a virtual stream identifier. For example, a physical stream #1 may have an outage occur or may be experiencing low bandwidth. This issue may affect the quality of service for the physical stream #1. Real-time service 108 may detect the issue, and stream state service 224 notifies virtual stream service 110. Also, stream state service 224 may notify video asset ingest service 106 of the issue; however, video asset ingest service 106 may not be able to react to the issue as quickly as virtual stream service 110. For example, video asset ingest service 106 may have to change the default stream 208 in bundles 210 to address the issue. It is possible video delivery system 102 may not even change default stream 208 in bundles 208 because virtual stream service 110 can process the requests with regard to the issue. Having virtual stream service 110 process the issue would mean less changes in bundles 210, which saves computing resources. Further, other services 110 may use bundles 210 and changing default stream 208 in bundles 110 may not be desirable for an issue that lasts a short amount of time.

At 504, virtual stream service 110 changes information for the physical stream. For example, virtual stream service 110 may change its current state to indicate a physical stream is encountering an outage. In other embodiments, virtual stream service 110 may determine a change in the ranking for the physical streams associated with the virtual stream identifier for the video asset. At 506, virtual stream service 110 analyzes the information to determine if a change in optimal physical stream for an associated virtual stream identifier occurred. For example, the optimal stream may be experiencing an outage and thus is not the optimal physical stream now. In some embodiments, virtual stream service 110 may insert a state of STREAM DOWN. This may change the optimal physical stream for the physical streams at this time. For example, virtual stream service 110 may rank physical stream #2 as being optimal during this time instead of a physical stream #1. In other examples, the issue may cause a change in ranking that may alter the scores that are used to determine the ranking. This may or may not result in a change in the order of the ranking. For example, a slower bandwidth being experienced by a physical stream may lower its score, but not enough to rank the physical stream lower than another physical stream.

At 508, virtual stream service 110 determines if there is a change in the optimal stream. In some embodiments, the issue may not result in a change to the optimal physical stream that is being sent to client 104. When there is a change, at 510, video stream service 110 notifies video playback service 112 of the change in the optimal stream. Then, video playback service 112 may notify client 104 of the change in the optimal stream. The notification may cause client 104 to send a new request for the video asset. This request may occur after client 104 has already started viewing the physical stream. The re-request can then start the process of switching physical streams. The request may include the same video asset identifier that was sent with the previous request. Then, the process described above with respect to FIG. 4 is performed. However, video stream service 110 determines the optimal video stream identifier for the virtual stream identifier again. In other embodiments, virtual stream service 110 may not notify video playback service 112 (and client 104). However, client 104 may be programmed to periodically send requests for the video asset identifier or when client 104 detects an issue. The new request would then be processed as described above and a new optimal physical stream is sent to client 104. The process allows client 104 to switch physical streams after first requesting another physical stream for a video asset.

At 512, virtual stream service 110 determines if a new request is received for the video asset identifier. When the new request is received, at 514, virtual stream service 110 determines the optimal physical stream identifier for the virtual stream identifier. Because the optimal physical stream has changed, virtual stream service 110 returns the physical stream identifier for the new physical stream. The new request may be from a new client 104 that requests the video asset or the new request may come from an existing client who is notified of the issue by video playback service 112. When a change in the optimal physical stream occurs, instead of having a client 104 send a new request, video playback service 112 may also automatically switch physical streams. For example, video playback service 112 may send client 104 a new manifest with the new physical stream. Client 104 would use the new manifest to request the new physical stream.

Database Table Examples

FIGS. 6A to 6B depict examples of a table 600 that virtual stream service 110 uses to determine the optimal physical stream identifier (ID) according to some embodiments. In FIG. 6A, table 600 includes a first column 602 that lists the virtual stream identifier (ID), a second column 604 that lists a physical stream identifier (ID) and a third column 606 that lists the rank. Table 600 lists two virtual stream identifiers, but table 600 may include other virtual stream identifiers.

The physical stream identifiers for each virtual stream identifier may be ranked according to one or more characteristics. In some cases, only one physical stream identifier may be associated with a virtual stream identifier, but in other cases, multiple physical stream identifiers may be associated with a virtual stream identifier. When multiple physical stream identifiers are associated with a virtual stream identifier, virtual stream service 110 ranks the physical stream identifiers. The ranking may be expressed using different systems, such as priority, scores, etc. In this example, the order from #1, #2, #3, etc. is used as the ranking, with #1 being the highest ranking, #2 the second highest, etc. For virtual stream identifier VS #1, the physical stream identifiers are ranked in the order of physical streams [PS #1, PS #3, PS #2]. For virtual stream identifier VS #2, two physical streams are ranked in the order of [PS #4, PS #5]. Accordingly, when virtual stream service 110 looks up a physical stream identifier for the virtual stream identifier, virtual stream service 110 selects physical stream PS #1 for virtual stream identifier VS #1 and physical stream PS #4 for virtual stream identifier VS #2. Additionally, if virtual stream service 110 receives a physical identifier, such as physical stream identifier PS #3, virtual stream service 110 would look up the corresponding virtual stream identifier VS #1, and then select physical stream identifier PS #1 instead of physical stream identifier PS #3.

Sometimes, a physical stream may experience an issue, and when this occurs, virtual stream service 110 may change the ranking found in table 600. FIG. 6B depicts an example of a state table 620 that reflects when an issue occurs with a physical stream according to some embodiments. A column 622 lists physical stream identifiers, a column 624 lists the current state of a physical stream, and a column 626 lists the time the change occurred. In a first row, physical stream #1 has been updated with a state of STREAM DOWN at a time of 2:00 p.m. In this example, physical stream PS #1 may have encountered an issue. Also, in a second row, physical stream #4 has been updated with a state of STREAM DOWN at a time of 4:00 p.m. When virtual stream service 110 determines the optimal physical stream, virtual stream service 110 uses the current state of the physical stream, such as virtual stream service 110 may not consider physical streams that are currently experiencing an outage. For example, when virtual stream identifier #1 is requested, virtual stream service 110 does not select physical stream #1 even though the stream has the first ranking, but rather does not consider physical stream #1. Rather, virtual stream service 110 selects the next highest ranked physical stream of physical stream #3. In other examples, virtual stream service 110 may adjust the rankings in table 600 based on the current state. For example, virtual stream service 110 may move the ranking of physical stream PS #1 to the ranking of #3, move the ranking of physical stream #3 from #2 to #1, and move physical stream #2 from the ranking of #3 to #2.

Virtual stream service 110 also uses the state and times in table 620 when responding to a request with a time range as described above. Virtual stream service 110 uses the time 2:00 p.m. to calculate the up time for physical stream PS #1.

Figure 7A:
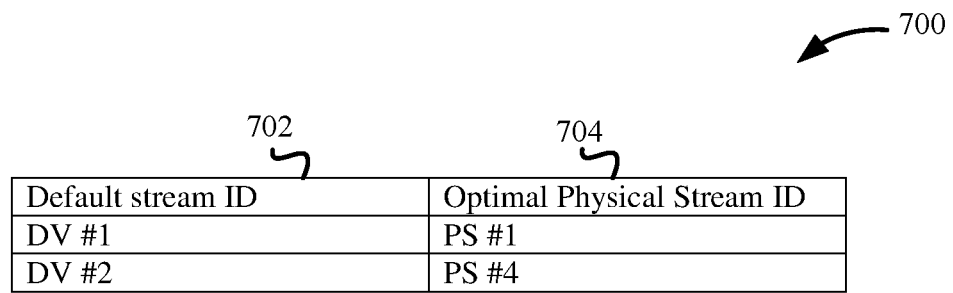
FIG. 7A shows an example of a table that is stored in cache memory according to some embodiments.

Client interface 220 may cache the physical stream identifier when it is received from virtual stream service 110. The cache allows stream identifier service 218 to more quickly respond to client requests. FIG. 7A shows an example of a table 700 that is stored in cache memory according to some embodiments. A first column 702 stores the default stream identifier and a second column 704 stores the optimal physical stream identifier. A default stream identifier is identified by a virtual stream identifier or a physical stream identifier. The identifiers shown here are a default stream identifier DV #1 and DV #2. Stream identifier service 218 may have received the optimal physical stream identifier from virtual stream service 110 and stored a physical stream identifier PS #1 for default stream identifier DV #1 and a physical stream identifier PS #4 for default stream identifier DV #2.

When a video asset identifier is received, client interface 220 may return the cached optimal physical stream identifier to stream identifier service 218. Stream identifier service 218 may use the optimal physical stream identifier in a request to virtual stream service 110. Using the optimal physical stream identifier in the request may help the performance of responding to the requests because virtual stream service 110 may just confirm whether the optimal physical stream identifier is still the optimal one. In this case, no mappings need to be performed. Also, stream identifier service 218 may return the optimal physical stream identifier to client 104 without having to use virtual stream service 110.

In some embodiments, when virtual stream service 110 encounters an issue with a physical stream, virtual stream service 110 may notify client interface 220 that an optimal physical stream has encountered an issue and client interface 220 may invalidate some entries of the cache. For example, virtual stream service 110 may notify client interface 220 that the optimal physical stream for default stream identifier DS #1 is invalid. Client interface 220 may then invalidate the best stream identifier PS #1 for default stream identifier DS #1 in table 700.

Figure 7B:
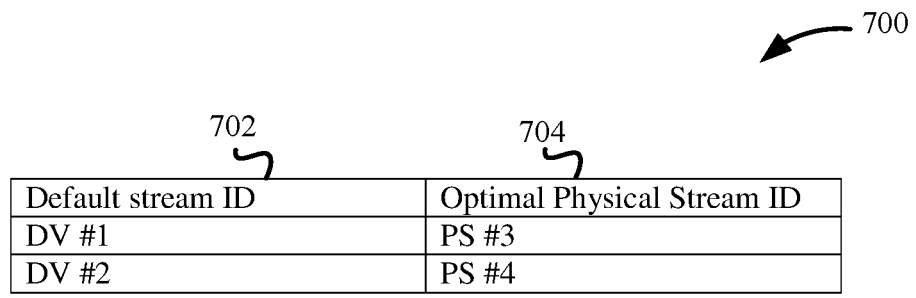
FIG. 7B shows an example of table after invalidating an optimal physical stream identifier according to some embodiments.

When another request for default stream identifier DS #1 is received, stream identifier service 218 may receive another optimal physical stream identifier from virtual stream service 110. FIG. 7B shows an example of table 700 after invalidating an optimal physical stream identifier according to some embodiments. For default stream identifier DS #1, stream identifier service 218 has inserted a new optimal physical stream identifier of BS #3. In this case, the physical stream PS #3 will be used instead of physical stream PS #1. Another method that could be used is a virtual stream identifier may have a fallback option. A second virtual stream identifier may be used when all physical streams for a first virtual stream identifier are experiencing issues. Virtual stream service may determine the optimal physical stream for the second virtual stream identifier in this case.

CONCLUSION

Accordingly, by using a virtual stream identifier, video delivery system 102 can address issues to physical streams in real-time. This is enabled by inserting virtual stream service 110 into the request processing flow. This bypasses having to change bundles that store metadata for the physical streams. This improves the speed in which issues can be addressed and also reduces the number of changes that are needed to the stored bundles.

System

Figure 8:
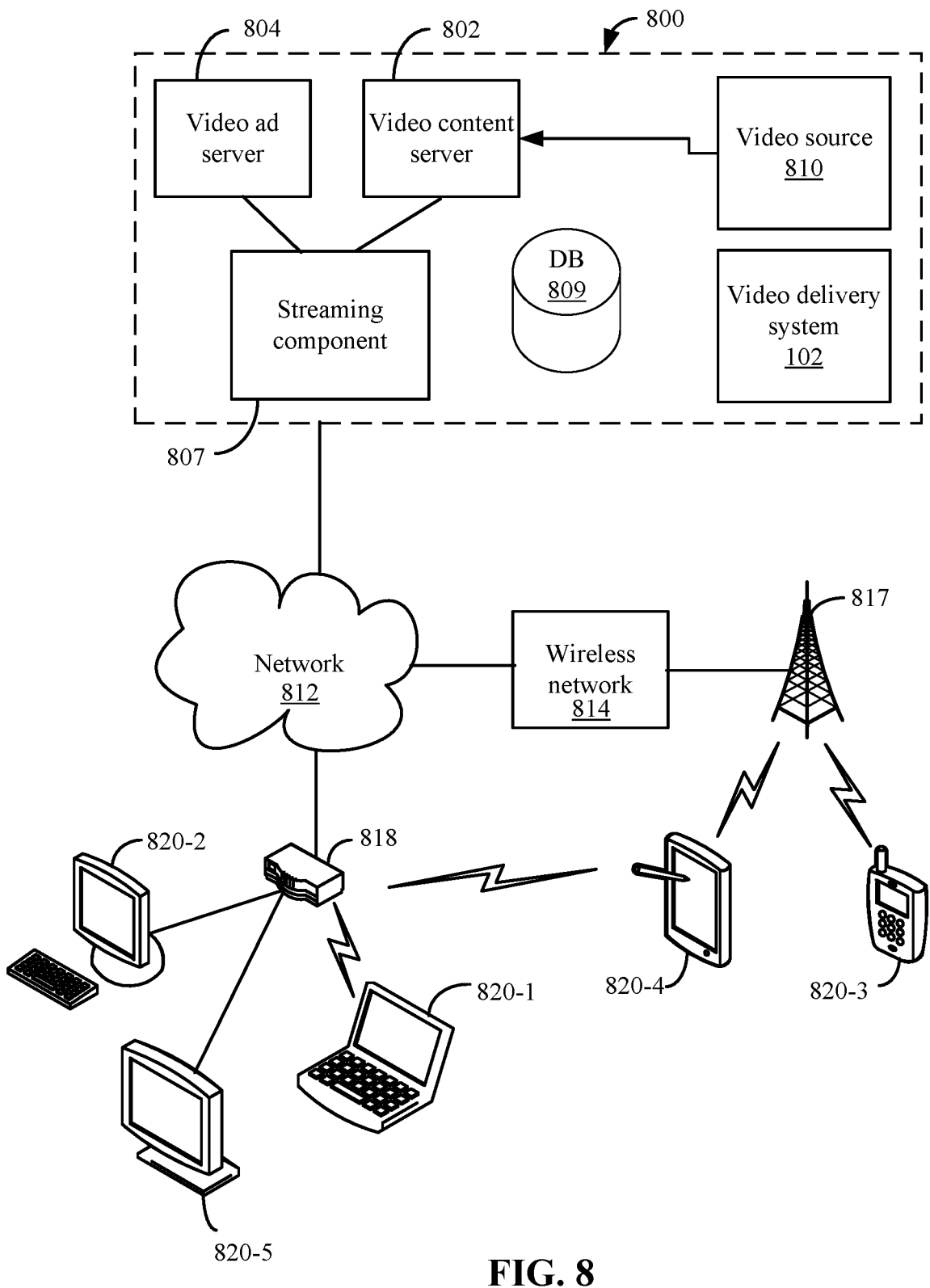
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 also may include video delivery system 102.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real-time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
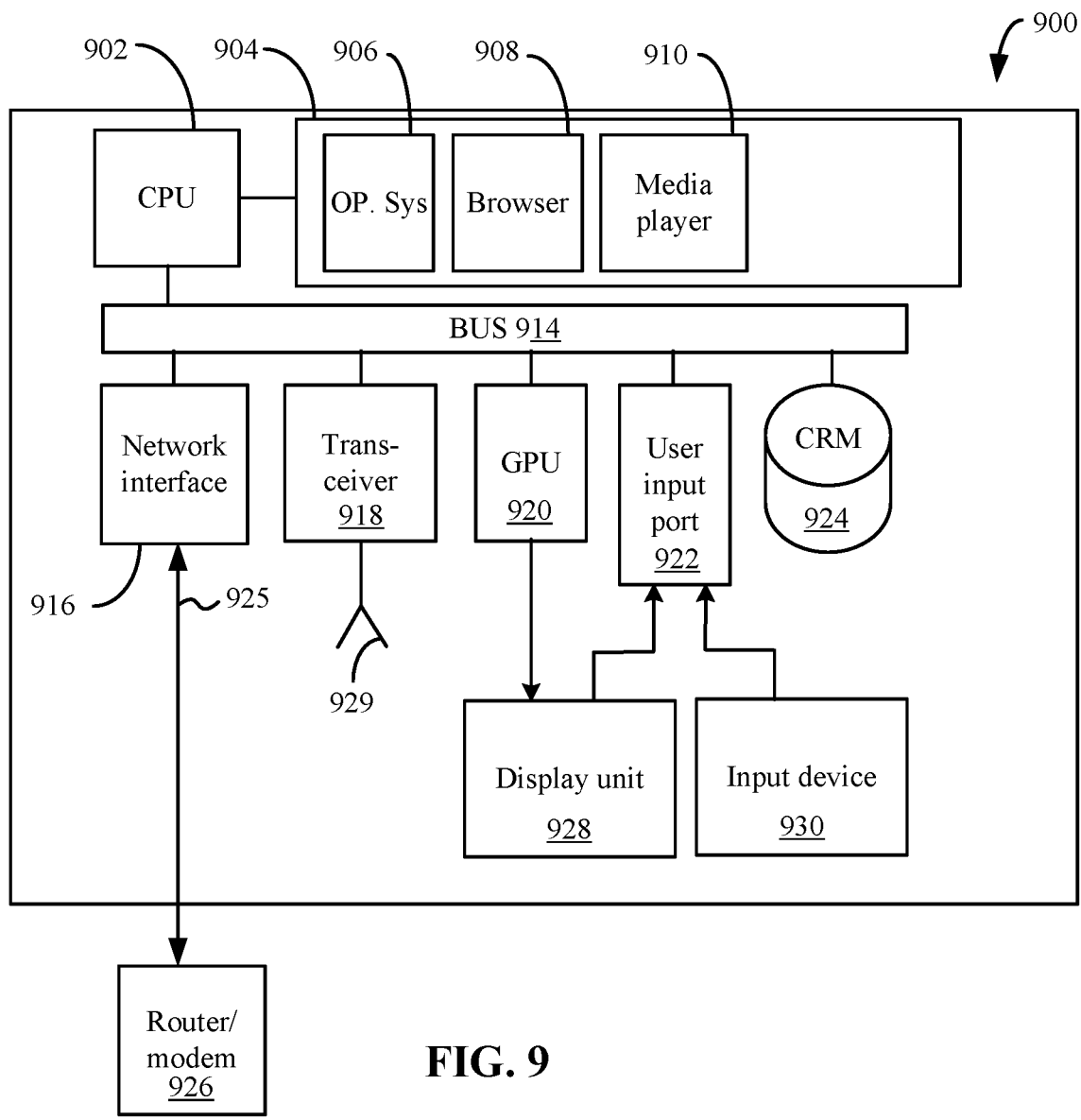
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a first request to play a video asset that is associated with content;
retrieving, by the computing device, a default stream identifier from a bundle that stores metadata about the video asset, wherein the default stream identifier identities a default stream for the video asset;
selecting, by the computing device, a virtual stream identifier for the default stream identifier, wherein the video asset is associated with a plurality of physical streams that include content that is the same;
mapping, by the computing device, the virtual stream identifier to a corresponding plurality of physical stream identifiers associated with the plurality of physical streams for the video asset, wherein each of the plurality of physical stream identifiers maps to the virtual stream identifier;
in response to receiving the first request for the video asset, analyzing, by the computing device, a ranking of the plurality of physical stream identifiers to select a first physical stream identifier from the plurality of physical stream identifiers, wherein the ranking of the plurality of physical stream identifiers is changed from a previous ranking for a second request to play the video asset based on receiving an indication of a state change for a physical stream in the plurality of physical streams, and wherein a second physical stream identifier was selected for the second request; and
outputting, by the computing device, the first physical stream identifier as the physical stream to use for the video asset, wherein the first physical stream identifier is sent to a client to allow the client to request the respective physical stream to play the content, and wherein the first physical stream identifier and the second physical stream identifier are selected for the first request and the second request, respectively, without changing the default stream identifier for the bundle.

2. The method of claim 1, wherein the state change is based a issue that comprises an interruption of service for a physical stream associated with one of the physical stream identifiers.

3. The method of claim 1, wherein the ranking removes the one of the physical stream identifiers from the previous ranking of the plurality of physical stream identifiers.

4. The method of claim 1, wherein:
the first request is associated with a first time range for the video asset, and
analyzing the ranking comprises using the first time range to select one of the physical stream identifiers.

5. The method of claim 4, wherein the one of the physical stream identifiers includes a largest amount of time without experiencing issues in the plurality of physical stream identifiers.

6. The method of claim 4, wherein analyzing the ranking comprises:
calculating a time for each of the plurality of physical stream identifiers where corresponding physical streams did not experience the issue, and
selecting a physical stream identifier that encountered a highest amount of time where issues were not experienced.

7. The method of claim 6, wherein:
when a tie in time occurs, selecting the physical stream identifier that was highest ranked between the physical stream identifiers that experienced the tie.

8. The method of claim 1, wherein physical streams in the plurality of physical streams include a characteristic that includes a different value for the characteristic for each of the plurality of physical streams.

9. The method of claim 1, wherein the ranking of the plurality of physical streams is based on states changes for at least a portion of the plurality of physical streams.

10. The method of claim 1, wherein each of the plurality of physical stream identifiers associated with the plurality of physical streams maps to a single virtual stream identifier.

11. The method of claim 1, further comprising:
receiving a first stream identifier that is associated with the first request for the video asset.

12. The method of claim 11, wherein:
the first stream identifier is one of the plurality of physical stream identifiers, and
selecting the virtual stream identifier comprises mapping the first stream identifier to the virtual stream identifier.

13. The method of claim 11, wherein the first stream identifier is the virtual stream identifier.

14. The method of claim 11, further comprising:
receiving a schedule for the video asset;
generating the bundle for the video asset, wherein the bundle includes a first asset identifier; and
the bundle is used to send the first asset identifier to the client, wherein the first asset identifier is associated with the first stream identifier.

15. The method of claim 1, wherein:
the first request is received after the second request for the video asset, and
the previous ranking was used to select a different physical stream identifier as the physical stream to use for the video asset to respond to second request.

16. The method of claim 1, further comprising:
upon receiving the indication of the state change, notifying the client to send the first request for the video asset based on the ranking being changed from the previous ranking.

17. A non-transitory computer-readable storage medium containing instructions, that when executed, control a computer system to be configured for:
receiving a first request to play a video asset that is associated with content;
retrieving a default stream identifier from a bundle that stores metadata about the video asset, wherein the default stream identifier identifies a default stream for the video asset,
selecting a virtual stream identifier for the default stream identifier, wherein the video asset is associated with a plurality of physical streams that include content that is the same;
mapping the virtual stream identifier to a corresponding plurality of physical stream identifiers associated with the plurality of physical streams for the video asset, wherein each of the plurality of physical stream identifiers maps to the virtual stream identifier;
in response to receiving the first request for the video asset, analyzing a ranking of the plurality of physical stream identifiers to select a first physical stream identifier from the plurality of physical stream identifiers, wherein the ranking of the plurality of physical stream identifiers is changed from a previous ranking for a second request to play the video asset based on receiving an indication of a state change for a physical stream in the plurality of physical streams, and a second physical stream identifier was selected for the second request; and outputting the first physical stream identifier as the physical stream to use for the video asset, wherein the first physical stream identifier is sent to a client to allow the client to request the respective physical stream to play the content, and wherein the first physical stream identifier and the second physical stream identifier are selected fro the first request and the second request, respectively, without changing the default stream identifier for the bundle.

18. The non-transitory computer-readable storage medium of claim 17, further operable for:
receiving a first stream identifier that is one of the plurality of physical stream identifiers, wherein:
selecting the virtual stream identifier comprises mapping the first stream identifier to the virtual stream identifier.

19. The non-transitory computer-readable storage medium of claim 17, wherein:
the first request is associated with a first time range for the video asset, and
analyzing the ranking comprises using the first time range to select one of the physical stream identifiers.

20. The non-transitory computer-readable storage medium of claim 17, wherein the plurality of physical streams include a characteristic that is different includes a different value for the characteristic for each of the plurality of physical streams.

21. An apparatus comprising:
one or more computer processors; and
a non-transitory computer-readable storage medium comprising instructions, that when executed, control the one or more computer processors to be configured for:
receiving a first request to play a video asset that is associated with content;
retrieving a default stream identifier from a bundle that stores metadata about the video asset, wherein the default stream identifier identifies a deafly stream for the video asset;
selecting a virtual stream identifier for the default stream identifier, wherein the video asset is associated with a plurality of physical streams that include content that is the same;
mapping the virtual stream identifier to a corresponding plurality of physical stream identifiers associated with the plurality of physical streams for the video asset, wherein each of the plurality of physical stream identifiers maps to the virtual stream identifier;
in response to receiving the first request for the video asset, analyzing a ranking of the plurality of physical stream identifiers to select a first physical stream identifier from the plurality of physical stream identifiers, wherein the ranking of the plurality of physical stream identifiers is changed from a previous ranking for a second request to play the video asset based on receiving an indication of a state change for a physical stream in the plurality of physical streams, and wherein a second physical stream identifier was selected for the second request; and
outputting the first physical stream identifier as the physical stream to use for the video asset, wherein the first physical stream identifier is sent to a client to allow the client to request the respective physical stream to play the content, and wherein the first physical stream identifier and the second physical stream identifier are selected for the first request and the second request, respectively, without changing the default stream identifier for the bundle.

22. The non-transitory computer-readable storage medium of claim 17, wherein:
the first request is received after the second request for the video asset, and
the previous ranking was used to select a different physical stream identifier as the physical stream to use for the video asset, to respond to second request.

* * * * *

UNITED STATES PATENT AND TRADEMARK OFFICE
CERTIFICATE OF CORRECTION

| | | |
|---|---|---|
| PATENT NO. | : 11,496,803 B2 | Page 1 of 1 |
| APPLICATION NO. | : 16/271574 | |
| DATED | : November 8, 2022 | |
| INVENTOR(S) | : McKay Salisbury and Jeremy Cutler | |

It is certified that error appears in the above-identified patent and that said Letters Patent is hereby corrected as shown below:

In the Claims

Claim 1, Column 17, Line 7, change "identities" to --identifies--

Signed and Sealed this
Tenth Day of January, 2023

Katherine Kelly Vidal
*Director of the United States Patent and Trademark Office*